R. RENNICK.
MILK CAN-COVER.
No. 183,775.                               Patented Oct. 31, 1876.
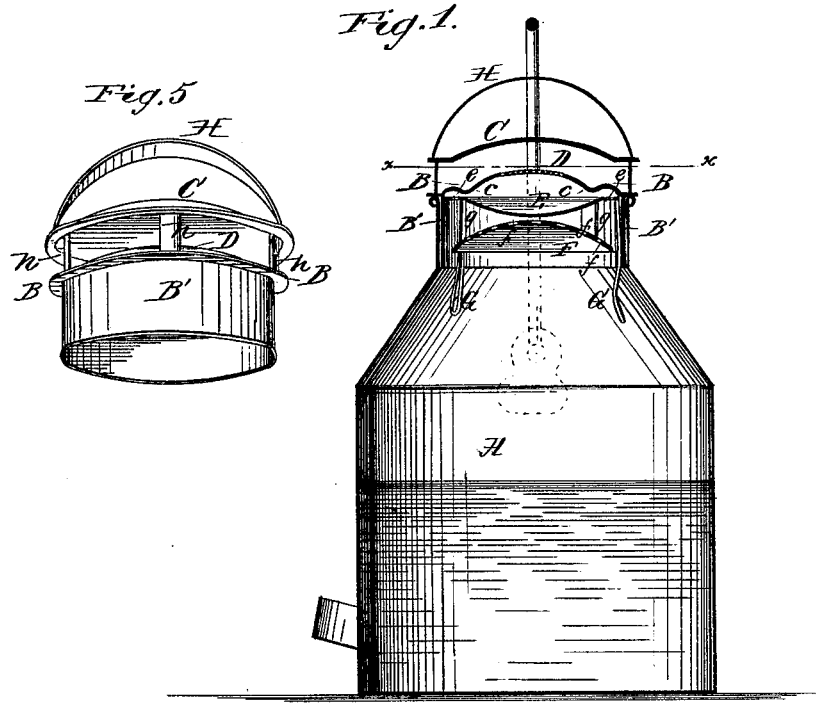
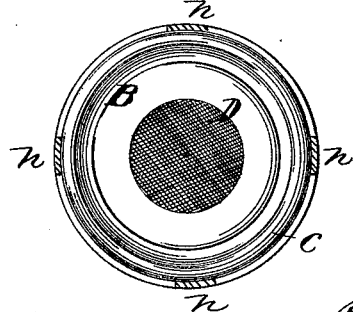
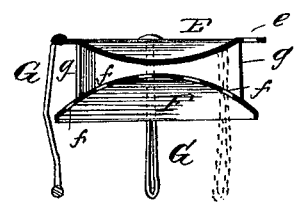
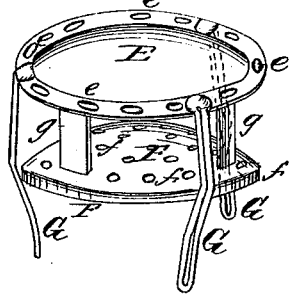
Witnesses.
Fred. G. Dieterich
D. P. Cowl
Inventor.
Robert Rennick
by S. S. Kirk
Atty
THE GRAPHIC CO. N.Y.

UNITED STATES PATENT OFFICE.

ROBERT RENNICK, OF KEENE, KENTUCKY.

IMPROVEMENT IN MILK-CAN COVERS.

Specification forming part of Letters Patent No. 183,775, dated October 31, 1876; application filed October 16, 1876.

*To all whom it may concern:*

Be it known that I, ROBERT RENNICK, of Keene, in the county of Jessamine and State of Kentucky, have invented certain new and useful Improvements in Ventilating-Covers for Milk-Vessels; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to provide ventilation for milk contained in cans or other vessels; and consists in openings in the lid or top of said vessels, and connecting devices, which, by the combination and arrangement of the several parts, shall afford sufficient opportunity at all times for the escape of any impure air, animal heat, and offensive odors which may exist, especially in fresh milk, while confined for the purpose of transportation; also, for supplying to the interior of said milk-vessels a current of pure air, without exposing the milk to injury from dust, rain, or other foreign substances.

The device is simple, easily cleaned, and readily adapted to milk-vessels of any dimensions. The several parts are made of the same material as the vessel, tin being preferred.

In the drawings, Figure 1 is a sectional view of an ordinary can, with the improved cover in use. Fig. 2 is a top view of an ordinary can top or plate, B, provided with opening D, covered with wire-gauze. Fig. 3 is a sectional view, on line $x\ x$, of the device to prevent the milk from splashing out when agitated. Fig. 4 is a perspective view of said device. Fig. 5 is a perspective view of an ordinary can-top, provided with extra plate C and opening D.

The same letters refer to similar parts in the drawings.

Plate B, with rim B', forms a cap or top similar to the ordinary can-top, except about the middle of the plate B I make an opening, D, about one-third of the diameter of the plate B, and cover the opening with fine wire-gauze or perforated tin, which permits the escape of the animal heat and offensive odors, &c., and thus prevents the decomposition of the animal matter and the milk becoming taint and sour so soon. This wire-gauze or perforated tin also prevents dust or other foreign substances from coming in contact with the milk.

I prefer to use the above arrangement as described, but, instead of making the large opening, and using the wire-gauze D, plate B may be perforated with small perforations.

To the bottom of plate B I secure the rim B', which fits down into the mouth of the vessel. To the top of plate B I connect an arched plate, C, by means of short standards or stays $h\ h\ h$. This plate C forms the final cover for the vessel, and prevents the rain or any foreign substance from coming in contact with the opening D. To the top of plate C is secured the ordinary handle H, and thus is completed my improved cover for milk-pans and ordinary milk-vessels.

For the purpose of preventing the milk from splashing through the gauze-covered opening D during agitation, as in transportation, and also to prevent any dust that might be admitted through the gauze-covered opening D from coming in contact with the milk, I make a concave plate, E, provided with vent-holes $e$, and to the bottom of plate E I connect plate F, by means of stays $g\ g\ g$. Said plate F is provided with perforations or small holes $f$. To the rim of plate E I secure springs G G G, which extend down by and free from plate F. This device is fitted into rim B' of plate B, so that the cavity of plate E comes immediately under the opening D in plate B. The cavity of plate E receives and retains any dust that may be admitted through the opening D, while the vent-holes $e$ in plate E and $f$ in plate F afford sufficient opportunity for the animal heat, &c., to escape through to plate B; thence, through opening D out into the open air, as in our improved cover for ordinary vessels hereinbefore described.

What I claim as new, and desire to secure by Letters Patent, is—

1. The ventilating-cover for milk-vessels, having perforated or gauze-covered opening or openings D and concavo-convex plate C, substantially as arranged and described.

2. The plate E, provided with springs G and perforated plate F, substantially as arranged, and for the purposes set forth.

3. The plates E and F, as arranged with the ventilating-top B, substantially as and for the purposes set forth.

4. The combination of one or more perforated deflecting plates with a ventilating milk-vessel top or lid, substantially as and for the purposes set forth.

In testimony that I claim the foregoing as my own I affix my signature in presence of two witnesses.

ROBERT RENNICK.

Witnesses:
T. F. SULLIVAN,
E. J. MIDDLETON, Jr.